(12) United States Patent
Abellán Alzallu et al.

(10) Patent No.: US 10,549,836 B2
(45) Date of Patent: Feb. 4, 2020

(54) AIRCRAFT FUSELAGE SECTION INCORPORATING A DYNAMIC HARNESS

(71) Applicant: Airbus Operations, S.L., Getafe (Madrid) (ES)

(72) Inventors: Felipe Abellán Alzallu, Madrid (ES); Alberto Ramos Guerrero, Madrid (ES); Adolfo Ávila Gutierrez, Madrid (ES); Juan Carlos Monje Martin, Madrid (ES)

(73) Assignee: Airbus Operations, S.L. (ES)

( * ) Notice: Subject to any disclaimer, the term of this patent is extended or adjusted under 35 U.S.C. 154(b) by 415 days.

(21) Appl. No.: 15/444,498

(22) Filed: Feb. 28, 2017

(65) Prior Publication Data
US 2017/0259899 A1 Sep. 14, 2017

(30) Foreign Application Priority Data
Mar. 14, 2016 (EP) .................................... 16382110

(51) Int. Cl.
*B64C 1/06* (2006.01)

(52) U.S. Cl.
CPC .............. *B64C 1/068* (2013.01); *B64C 1/061* (2013.01); *B64C 1/065* (2013.01)

(58) Field of Classification Search
CPC ......... B64C 1/061; B64C 1/065; B64C 1/068; B64C 1/26; B64C 5/02

USPC .................................................. 244/119, 120
See application file for complete search history.

(56) References Cited

U.S. PATENT DOCUMENTS

| 2010/0108803 | A1 | 5/2010 | Arevalo Rodriguez |
| 2016/0052620 | A1 | 2/2016 | Hussey |
| 2016/0325822 | A1* | 11/2016 | Mosqueira ................ B64C 3/18 |
| 2016/0340022 | A1* | 11/2016 | Garcia Nieto .......... B64C 3/185 |

FOREIGN PATENT DOCUMENTS

EP         2889216 A1      7/2015

OTHER PUBLICATIONS

EP 16382110.1 search report dated Jul. 4, 2016.

* cited by examiner

*Primary Examiner* — Bret Hayes
(74) *Attorney, Agent, or Firm* — Lerner, David, Littenberg, Krumholz & Mentlik, LLP

(57) ABSTRACT

A harness routing electrically connects a rear fuselage section of an aircraft and a trimmable Horizontal Tail Plane (HTP) installed at this rear section. The aircraft rear section includes a first clipping point wherein the harness is attached to a fuselage frame located in front of the torsion box front spar, and a second clipping point wherein the harness is attached to a front spar of the HTP torsion box. The second clipping point is located downstream from the first clipping point from the fuselage towards the torsion box interior, and the harness passes through the front spar towards the interior of the torsion box downstream the second clipping point.

6 Claims, 5 Drawing Sheets

AIRCRAFT FUSELAGE SECTION INCORPORATING A DYNAMIC HARNESS

FIELD OF THE INVENTION

The present invention refers to a harness installation in an aircraft, to operate as dynamic electric interface between fixed and movable aircraft structural parts.

More specifically, the invention refers to an electrical harness routing connecting a rear fuselage section of an aircraft and a trimmable Horizontal Tail Plane (HTP) installed at this rear section.

BACKGROUND OF THE INVENTION

The HTP is a trimmable component of the aircraft which rotates around an axis fitted to a rear spar of the HTP torsion box. Trimming of HTP is produced frequently during a normal flight, although not always the movement goes from the upper to the lower extreme positions, but small movements are normally produced during the entire flight. The result of that is the electrical harnesses installed at the HTP, are frequently moved with the HTP and therefore they are flexed continuously during the aircraft operative life.

It is also important to minimize the length of the harness to reduce their weight and cost. For that reason, traditionally harnesses at the rear section of an aircraft are fixed to a frame close to the rear spar where the rotation axis is located, and from there the harness passes through the rear spar to the HTP interior. This traditional location of the harnesses at the rear spar, is preferred because it is the nearest location to the rotation axis of the HTP where the relative movement between components is minimal, and as consequence, the length of dynamic harnesses at this area is also minimal.

On the other hand, it is known that electrical dynamic harnesses behave properly with flexion but not so good with torsion efforts. Therefore, as general rule, when a harness is placed in a dynamic area, like for instance a trimmable HTP, it shall be installed such as it is flexed on the same plane. In this way, when the harness is moved, it is maintained on the same plane such as the harness, and therefore the cables housed in it, are subjected only to a flexion effort.

A harness is formed by a plurality of cables enclosed by an electromagnetic (EMI) protection, and all together housed within a protective sleeve. It is essential to assure that none of the harness components would be damaged due to fatigue, during the entire operational life of the aircraft. The EMI protection is a delicate component because it is formed by a lot of thin metallic interwoven metallic strands, which can be broken easily as a result of fatigue.

Taking into account this premise (dynamic movement of harnesses produced on same plane), it is necessary that the attachment points between the harness and the aircraft structure, are keep on same plane so that the path described by the dynamic harnesses is perpendicular to the rotation axis. This concept is illustrated in FIG. 1.

FIG. 1 shows a pair of harnesses, left and right harness ($5a,5b$) running across the interior of an HTP (2) and passing respectively through left and right rear spars ($8a,8b$). Left and right harness ($5a,5b$) have respectively first and second attachment points ($5a1,5a2$),($5b1,5b2$), wherein the first attachment points are fixed to a fuselage frames.

BRIEF SUMMARY OF THE INVENTION

In aeronautical industry, especially in the manufacture of commercial aircrafts, there is always the need for lighter and cheaper aircraft components, in order to reduce both manufacturing costs and fuel consumption.

An aspect of the invention is to optimize the harness installation and routing, in order to reduce harness length and cost therefore reducing cost of an aircraft section, and at the same time assuring that any damage to the harness cables are prevented during the entire aircraft operative life.

Aspects of the present invention overcome the above-mentioned drawbacks of the prior art, by providing an aircraft rear section conventionally comprising a fuselage section incorporating a plurality of frames, and a torsion box installed at the fuselage section. The torsion box has a front spar and a rear spar, and wherein the torsion box is trimmable about a rotation axis coupled to the rear spar. The aircraft rear section comprises a cables harness having a portion fixed to the fuselage section, and a portion extending through the torsion box interior, such as the harness is flexed with the movement of the torsion box.

According to an embodiment of the invention, the aircraft rear section further comprises a first clipping point wherein the harness is attached to a fuselage frame located at the level of front spar, and a second clipping point, consecutive to the first clipping point, wherein the harness is attached to the front spar. The second clipping point is located downstream the first clipping point, considering a direction from the fuselage towards the torsion box interior. Downstream the second clipping point, the harness passes through the front spar towards the interior of the torsion box.

A challenge of the present invention is that, the consequence of having the harness located in an area near the front spar of the HTP instead of the rear spar, is that the electrical harnesses has to be adapted to a larger relative movement between the fuselage and the HTP.

Additionally, the new arrangement of the harness shall be in compliance with the following installation requirements:
ensure the required clearance between harnesses: typically there are two or more harnesses placed at the Front Spar LH and two or more harnesses placed at the Front Spar RH side,
ensure the required clearance between harnesses and the structure,
ensure the required bend radius of harnesses to avoid any damage of internal wires,
length of harnesses shall be enough to allow the HTP trimming, from the upper to lower end positions.

In order to overcome these challenges, it was found that the path defined by the dynamic harnesses should not be perpendicular to the HTP rotation axis. However, it has to be considered that for this non-perpendicular installation, the electrical harnesses would be subjected to torsion efforts, and as explained before, electrical harnesses work properly with flexion but not with torsion efforts.

To solve this, the axis of the first clipping point forms an angle ($\beta$) within the range (40°-50°), (in a top plan view) with the HTP rotation axis, in order to reduce torsion efforts in the harness. Furthermore, the axis of the second clipping point is parallel to the front spar, taking into account that the spar is straight. Preferably the angle ($\beta$) is 45°.

Additionally, the dynamic length of harnesses has been increased by the addition of a guiding device in the form of a tubular sleeve, located between the harness and a clipping point. This sleeve is fixed to the harness to allow the rotation of the harness inside the first clipping point at HTP. By increasing the length of the harness in the dynamic area, the torsion effort of the harness is significantly decreased.

Some advantages of the invention are the followings (for a specific aircraft type):

1.—Weight reduction about 6.2 Kg.

At least 30 meters of harnesses and 80 brackets can be eliminated. This represents a 15% HTP harnesses installation weight reduction.

2.—Recurrent cost saving about 7.9 K$.

1.6 K$ saving due to the simplification of harness installation on the HTP upper skin.

13 hours of installation time reduction.

6.3 K$ saving due to cheaper harnesses because they are shorter.

3.—Improve technically 3.2 K$ of Recurrent cost and 14 K$ of Non Recurrent Cost.

Better accessibility to the HTP due to removal of harness routing on the HTP upper skin

*The maintenance and the FAL staff access on this area of the HTP upper skin, to install the Vertical Tail Plane (VTP). An estimation of 30 hours reduction of maintainability task during the entire life of the aircraft.

*The risk of damage of the harness due to skydroll drops from the VTP or people steps is reduced. This implies a cost reduction of 15 hours due to the not replacement and repair of damaged harnesses as an average during the entire life of the aircraft.

Reduce the influence of Ground Reference Fluctuation (GRF). A Design deviation will be removed this will means 100 hours of saving as no recurrent cost.

Improvement of the installation design including better segregation from different networks.

BRIEF DESCRIPTION OF THE DRAWINGS

Preferred embodiments of the invention, are henceforth described with reference to the accompanying drawings, wherein.

DETAILED DESCRIPTION

Figure 1:
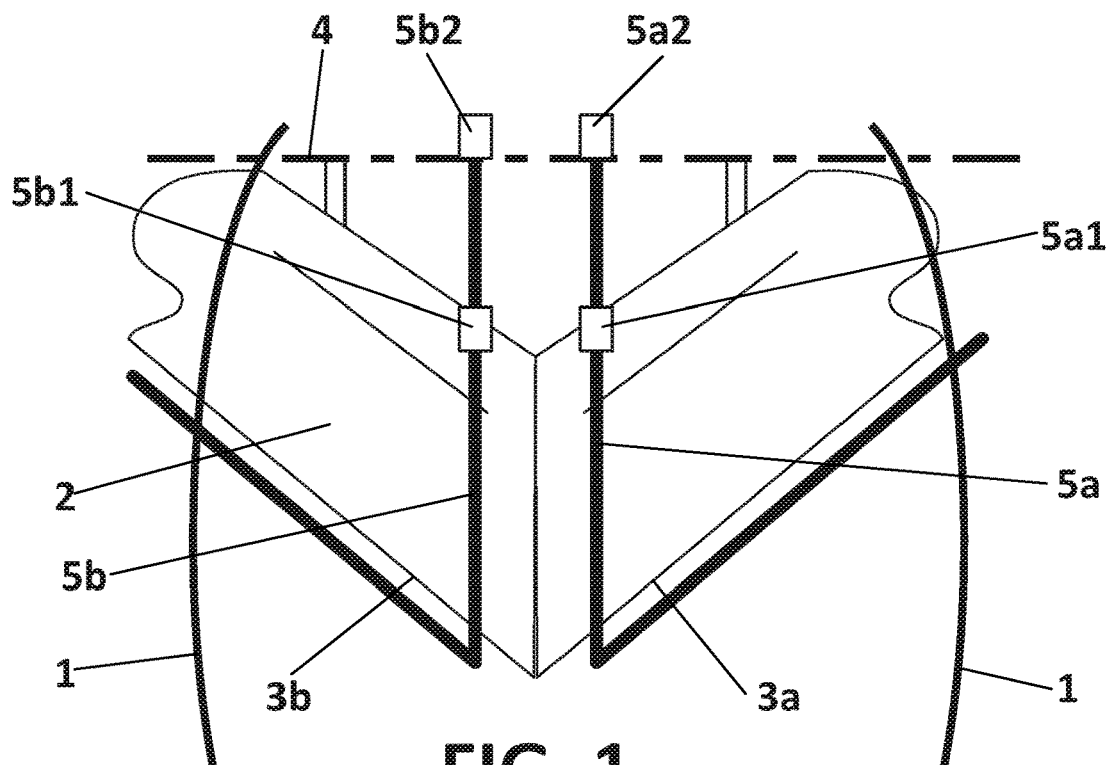
FIG. 1 shows a schematic representation of a classical harness routing at a fuselage rear section according to the prior art.
Figure 2:
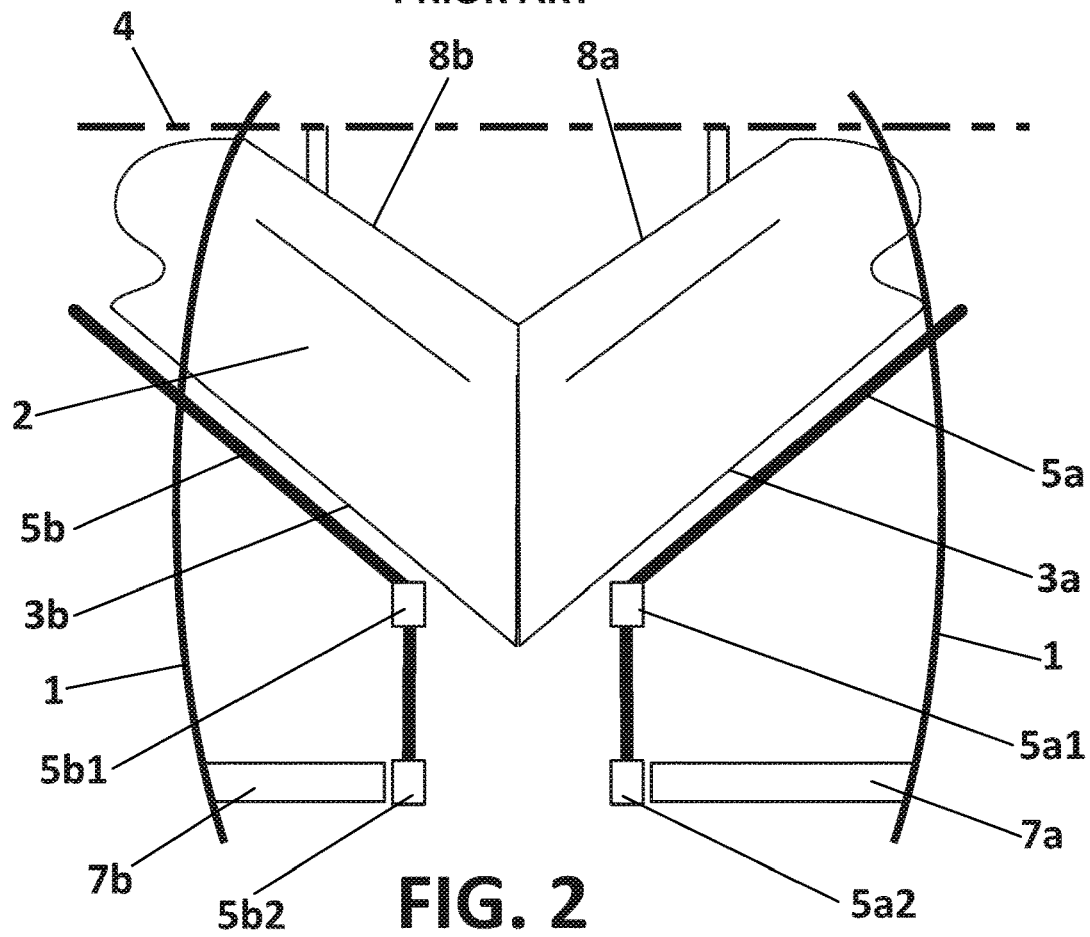
FIG. 2 shows a schematic representation of a harness routing at a fuselage rear section according to an embodiment of the invention.
Figure 3A:
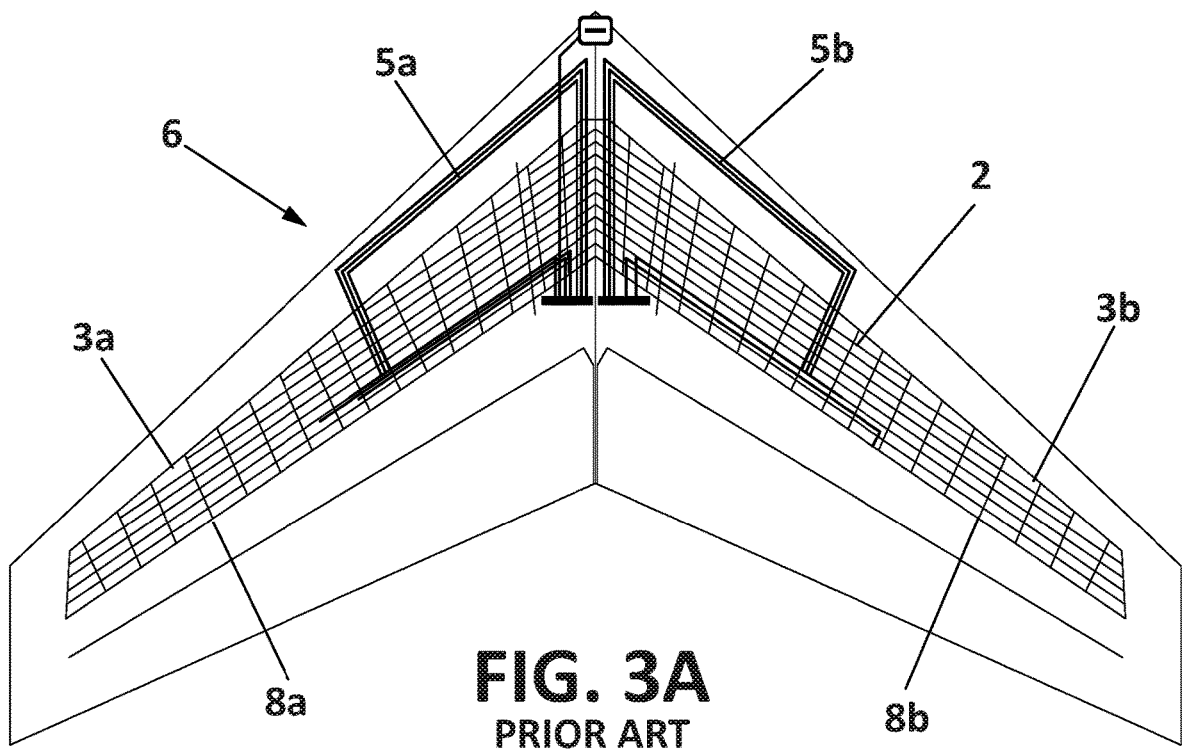
FIG. 3A shows a harness installation at a real HTP according to the prior art and FIG. 3B shows a harness installation at a real HTP according to an embodiment of the invention.
Figure 3B:
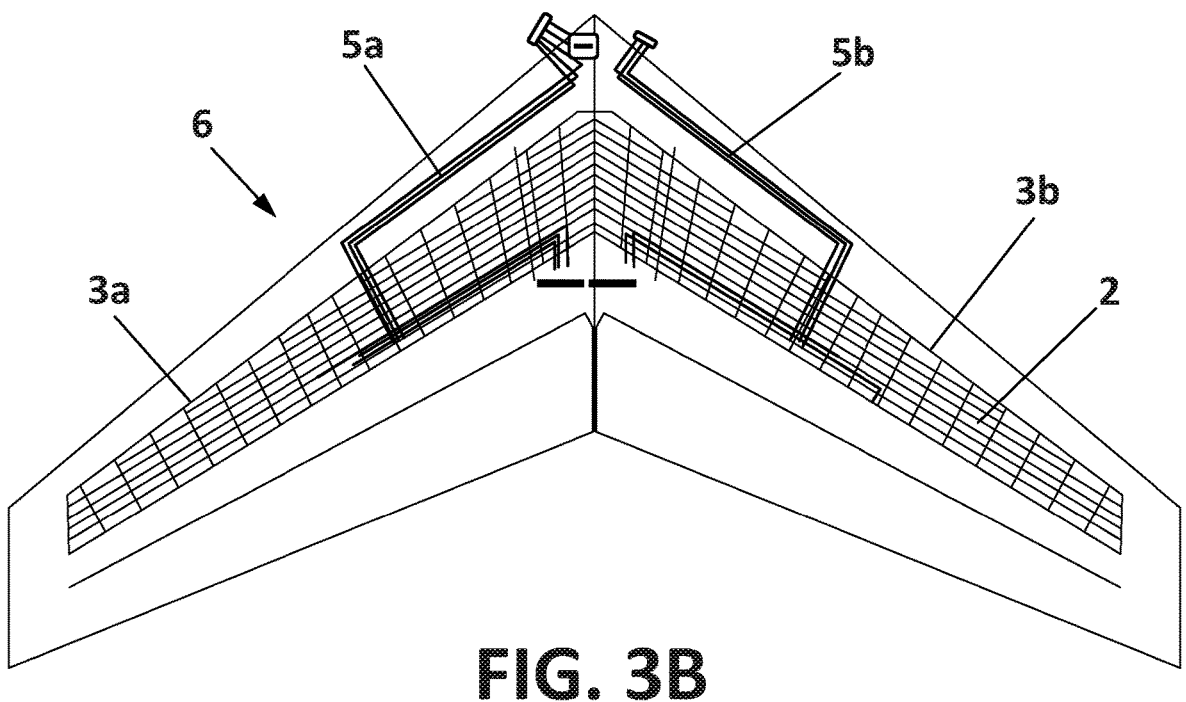

FIG. 2 shows schematically an aircraft rear section comprising a fuselage section (1) incorporating a left frame (7a) and a right frame (7b), and a torsion box (2) of an HTP installed at the fuselage section (1). The torsion box (2) has a left front spar (3a) and a right front spar (3b), and left rear spar (8a) and a right front spar (8b), and it is trimmable about a rotation axis (4) coupled to the rear spars (8a,8b).

Left and right cables harnesses (5a,5b) have a portion fixed to the fuselage section (1), in particular to the left and right frames (7a,7b) respectively, by means of left and right first clipping points (5a2,5b2). As it can be noted in FIG. 2, these fuselage frames (7a,7b) are located in front of the torsion box front spars (3a,3b).

The harnesses (5a,5b) are then attached to the front spars (3a,3b) respectively at left and right second clipping points (5a1,5b1), wherein the second clipping points (5a1,5b1) are located downstream from the first clipping points (5a2,5b2) as the harnesses (5a, 5b) extend along the front spars (3a, 3b) away from the first clipping points (5a2, 5b2). Downstream from the second clipping points, the harnesses pass through the front spars (3a,3b) towards the interior of the torsion box (2).

For this new arrangement of the harnesses in front of the torsion box, it has been found a balance between an optimized electrical installation and to keep the path of the dynamic length of harnesses as close as possible to a plane. Furthermore, the torsion efforts which now appear at the dynamic harness, have been mitigated during the whole extend of the trimming operation.

Figure 4A:
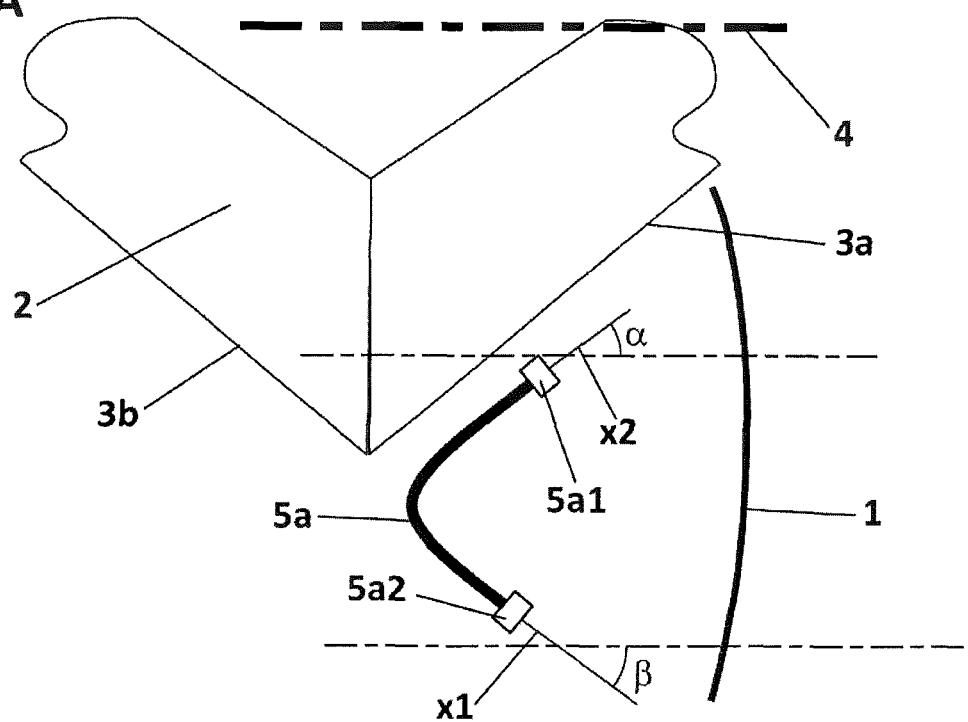
FIGS. 4A-4B show schematic representations of the installation angles for the harness according to an embodiment of the invention. The dotted lines are parallel to the rotation axis. Only one harness is represented for the sake of simplicity of the figure. The drawings shown the torsion box in its horizontal position.
Figure 4B:
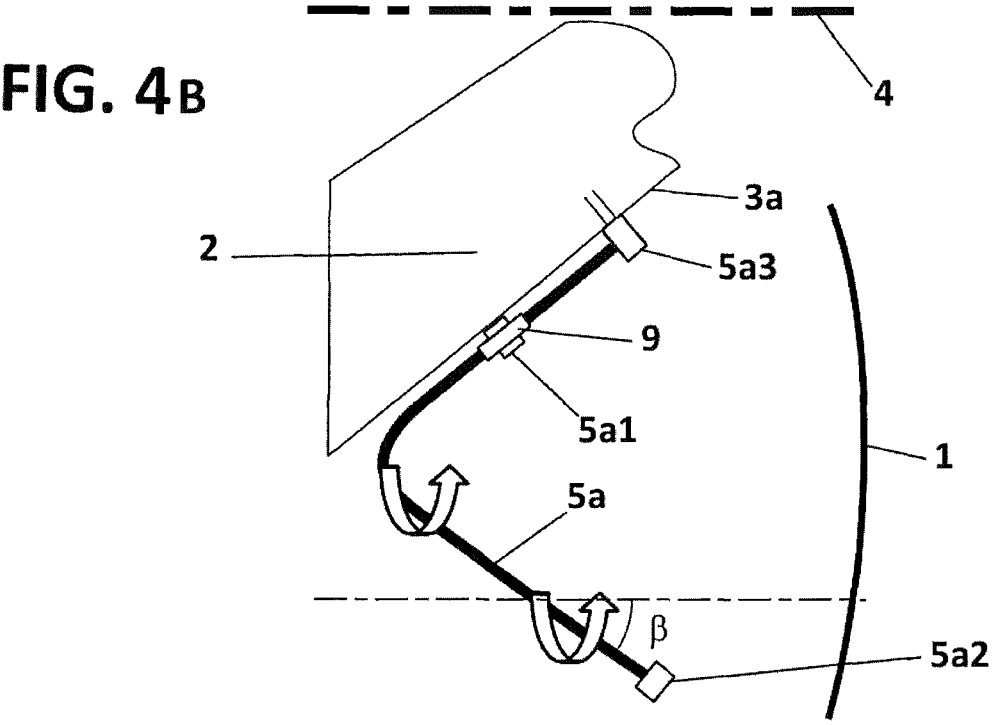

A preferred solution is shown in FIG. 4 wherein it can be noted that the axis (x1) of the first clipping point (5a2) forms an angle ($\beta$) (in a top plan view) with respect to the rotation axis (4), and that angle ($\beta$) is within the range (40°-50°), preferably 45°. This angle has been defined taken into account that if $\beta$ increases, the behaviour of dynamic harness improves (less torsion), but a bigger and therefore heavier clamp and structure would be needed to fix the harness to the frame.

Additionally, the axis (x2) of the second clipping point (5a1) is parallel to the front spar which is a straight element. Alternatively, it can be defined that the second clipping point (5a1) forms an angle ($\alpha$) (in a top plan view) with respect to the rotation axis (4), and that angle ($\alpha$) is about 35°.

Figure 5A:
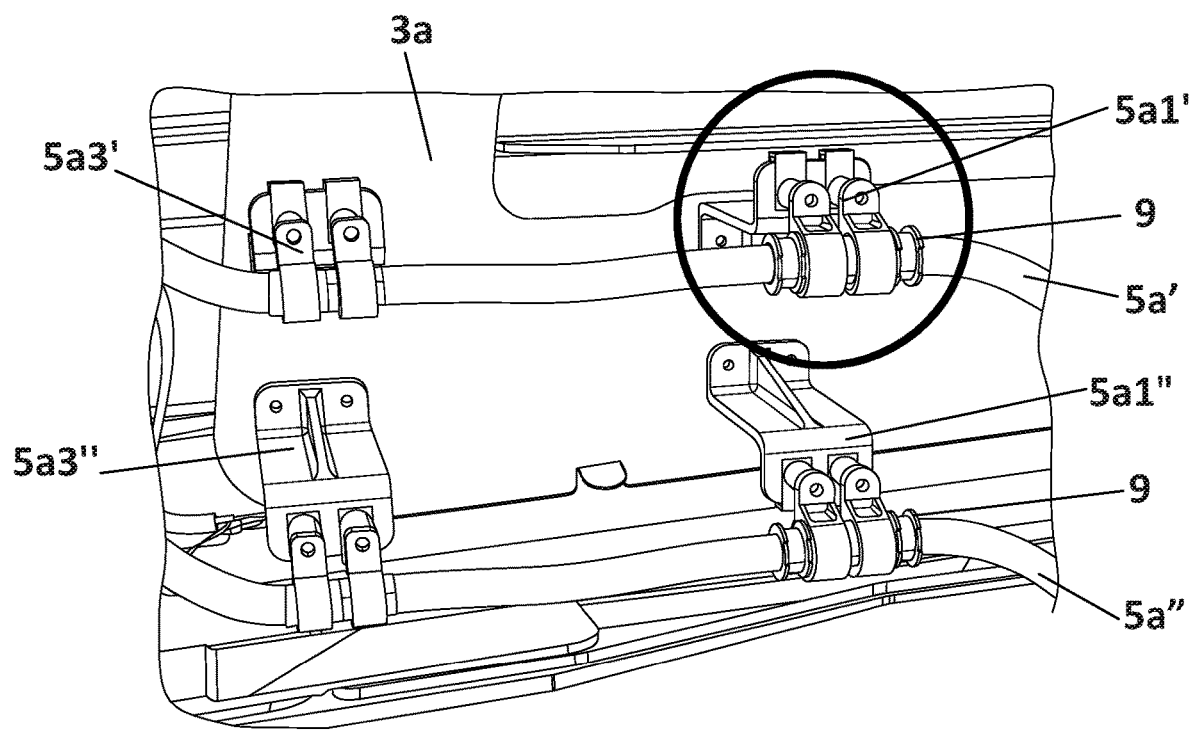
FIG. 5A shows a detailed representation of harnesses portions fitted to a front spar of a torsion box and FIG. 5B is an enlarged detail extracted from FIG. 5A.
Figure 5B:
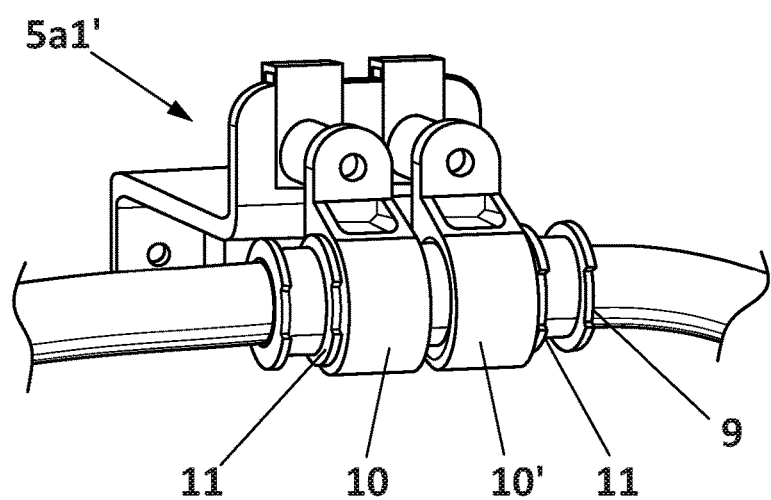

The first clipping points (5a2,5b2) include one support which contain two p-clamps and the harness is fixed to these clipping points. However, as shown in FIG. 5 the second clipping point (5a1) which includes two support (which contain two p-clamps per support) fixed to the left front spar (3a). The support (5a1) incorporates a tubular sleeve (9) fitted inside the clamps (10,10') such as the tubular sleeve (9) is rotatable inside the clamps (10,10'). The sleeve (9) is placed around and co-axially with the harness and it is fixed to the harness. The sleeve (9) increases the dynamic length of the harness by allowing rotation of the harness inside the clipping point.

The sleeve (9) has some annular protrusions (11,11') on its outer surface and in contact with the edges of the clamps (10,10'), such as the sleeve (9) cannot move axially with respect to the clamps (10,10').

As shown in drawing 4B, downstream the second clipping point (5a1), there is a third harness clipping point (5a3) fixed to the front spar (3a), and from here the harness passes through the front spar (3a) to the torsion box interior. At the third clipping point (5a3) the torsion effect disappear, and terminate the dynamic length of the harness.

Figure 6:
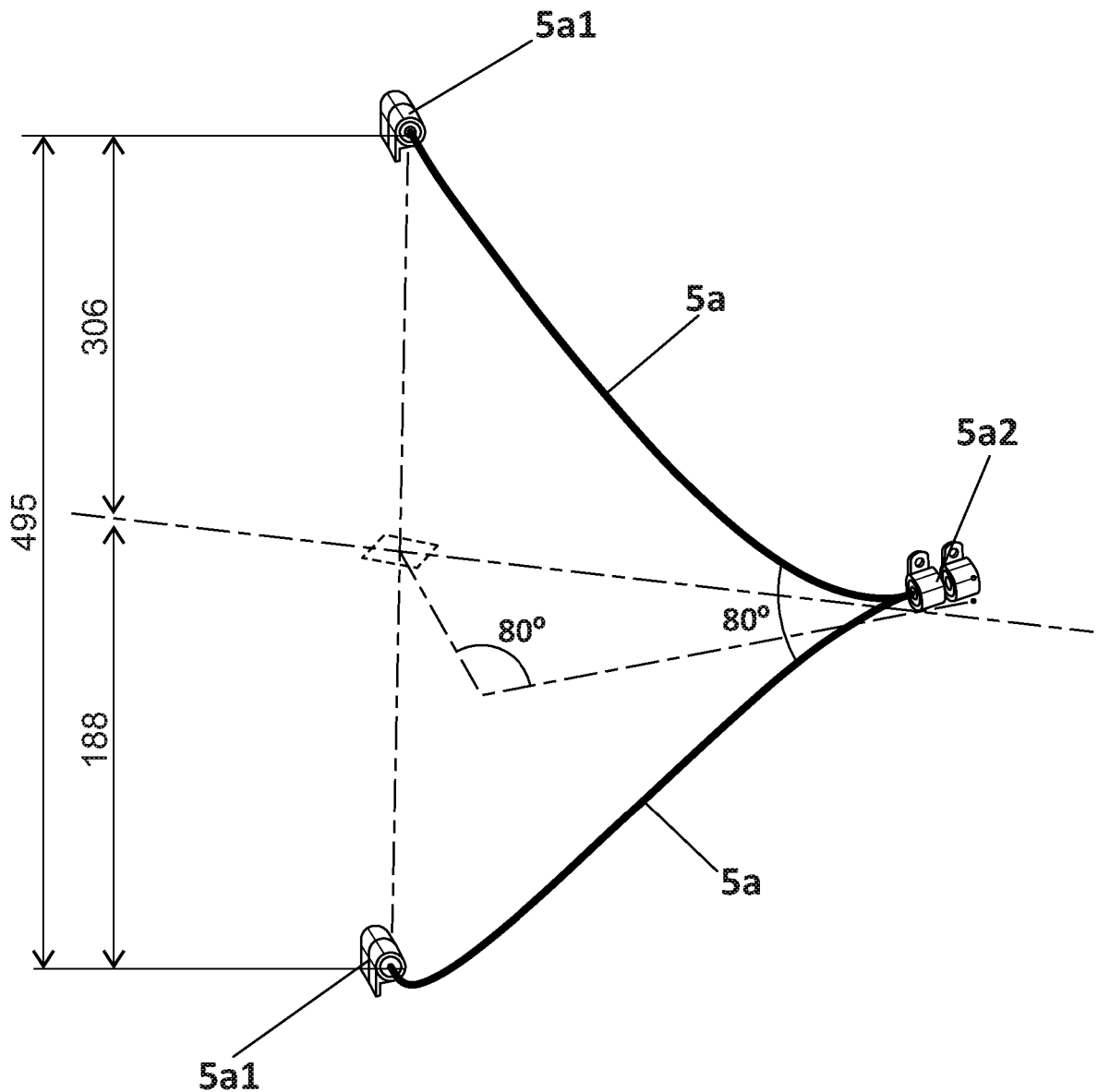
FIG. 6 shows the movement and angles of a harness arranged according to an embodiment of the invention.

The movement of the dynamic harness caused by the movement of the HTP, is represented in FIG. 6. It is assured that the dynamic harness can move from the maximum upper position to the maximum bottom position of the HTP. A Trimmable Horizontal Stabilizer Actuator (THSA) moves the HTP at the center of the front spars. The range of THSA in the aircraft introduce an angles change that goes from −0.8° to −13.7° in vertical axis (overstroke is not included), as shown in FIG. 6. This range produces an angle of 80 degrees in the fixed clipping point at the fuselage frame.

Other preferred embodiments of the present invention are described in the appended dependent claims and the multiple combinations thereof.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft rear section comprising:
   a fuselage section incorporating a plurality of frames;
   a torsion box installed at the fuselage section, wherein the torsion box has a front spar and a rear spar, and wherein the torsion box is trimmable about a rotation axis;
   a cables harness having a first portion fixed to the fuselage section and a second portion extending through the torsion box interior, such that the cables harness is flexed with a movement of the torsion box;
   a first clipping point wherein the cables harness is attached to one of the plurality of frames located in front of the torsion box front spar; and
   a second clipping point wherein the cables harness is attached to the front spar, wherein the second clipping point is located downstream from the first clipping point towards the torsion box interior, and the cables harness passes through the front spar towards the interior of the torsion box downstream from the second clipping point.

2. The aircraft rear section according to claim 1, wherein each of said first and second clipping points has an axis, and wherein the axis of the first clipping point forms an angle ($\beta$) in a top plan view with the rotation axis within the range (40°-50°), and wherein the axis of the second clipping point is parallel to the front spar.

3. The aircraft rear section according to claim 2, wherein the angle ($\beta$) is 45°.

4. The aircraft rear section according to claim 1, wherein the second clipping point has a p-shaped clamp fixed to the front spar, and a tubular sleeve fitted inside the clamp such that the tubular sleeve is rotatable inside the clamp, and wherein the cables harness is placed and fixed inside the tubular sleeve.

5. The aircraft rear section according to claim 1, wherein the cables harness is fixed at the first clipping point.

6. The aircraft rear section according to claim 1, further comprising a third harness clipping point fixed at the front spar, and located downstream from the second clipping point.

* * * * *